United States Patent
Boyer et al.

[11] Patent Number: 5,935,543
[45] Date of Patent: Aug. 10, 1999

[54] AMORPHOUS PRECIPITATED SILICA

[75] Inventors: James L. Boyer, Monroeville; Thomas G. Krivak, Harrison City; Robert C. Wang, Wexford; Laurence E. Jones, Monroeville, all of Pa.

[73] Assignee: PPG Industries Ohio, Inc., Cleveland, Ohio

[21] Appl. No.: 08/909,041

[22] Filed: Aug. 8, 1997

Related U.S. Application Data

[63] Continuation-in-part of application No. 08/657,730, May 31, 1996, abandoned.

[51] Int. Cl.$^6$ ............................ C01B 33/12; C04B 14/04
[52] U.S. Cl. ......................... 423/339; 423/335; 106/482; 106/492
[58] Field of Search .................................. 423/335, 339; 106/482, 492

[56] References Cited

U.S. PATENT DOCUMENTS

| | | | |
|---|---|---|---|
| 3,351,495 | 11/1967 | Larsen et al. | 136/146 |
| 3,696,061 | 10/1972 | Selsor et al. | 260/2.5 M |
| 3,798,294 | 3/1974 | Hollenbeck et al. | 264/41 |
| 4,024,323 | 5/1977 | Versteegh | 429/249 |
| 4,210,709 | 7/1980 | Doi et al. | 429/250 |
| 4,237,083 | 12/1980 | Young et al. | 264/41 |
| 4,251,281 | 2/1981 | Machurat et al. | 106/288 |
| 4,331,622 | 5/1982 | Doi et al. | 264/45.3 |
| 4,335,193 | 6/1982 | Doi et al. | 429/251 |
| 4,648,417 | 3/1987 | Johnson et al. | 134/105 |
| 4,681,750 | 7/1987 | Johnson et al. | 423/339 |
| 4,708,859 | 11/1987 | Chevallier | 423/339 |
| 4,734,229 | 3/1988 | Johnson et al. | 264/40.6 |
| 5,009,971 | 4/1991 | Johnson et al. | 429/252 |
| 5,094,829 | 3/1992 | Krivak et al. | 423/339 |
| 5,194,279 | 3/1993 | Okel | 426/330 |
| 5,353,999 | 10/1994 | Dew et al. | 241/30 |
| 5,412,018 | 5/1995 | Krivak et al. | 524/492 |
| 5,589,150 | 12/1996 | Kano et al. | 423/339 |
| 5,603,920 | 2/1997 | Rice | 423/335 |
| 5,605,569 | 2/1997 | Boyer et al. | 423/335 |

*Primary Examiner*—Gary P. Straub
*Assistant Examiner*—Cam N. Nguyen
*Attorney, Agent, or Firm*—George D. Morris

[57] ABSTRACT

Amorphous precipitated silica which may be used to form battery separators of very low specific resistance is characterized by (a) a CTAB surface area in the range of from 140 to 185 m$^2$/g; (b) a DBP oil absorption in the range of from 210 to 310 cm$^3$/100 g; (c) a mean ultimate particle size in the range of from 10 to 18 nm; (d) a total intruded volume in the range of from 2.6 to 4 cm$^3$/g; and (e) an intruded volume in the range of from 0.9 to 2 cm$^3$/g for pores having diameters in the range of from 20 to 100 nm.

4 Claims, No Drawings

AMORPHOUS PRECIPITATED SILICA

This application is a continuation-in-part of application Ser. No. 08/657,730, filed May 31, 1996, now abandoned.

The use of amorphous precipitated silica as a component of microporous polymeric battery separators is known. See, for example, U.S. Pat. Nos. 3,351,495; 3,696,061; 3,798,294; 4,024,323; 4,210,709; 4,237,083; 4,331,622; 4,335,193; 4,648,417; 4,681,750; and 4,734,229. A characteristic of great importance to battery separators is that of low specific resistance. The specific resistance of a battery separator is determined by many factors including but not limited to the identities and proportions of materials of construction, the physical dimensions of which thickness is especially important, the porosity, and the types and numbers of the pores.

An amorphous precipitated silica has now been found which may be used to form battery separators of very low specific resistance. Accordingly, the invention is amorphous precipitated silica characterized by (a) a CTAB surface area in the range of from 140 to 185 $m^2/g$; (b) a DBP oil absorption in the range of from 210 to 310 $cm^3/100$ g; (c) a mean ultimate particle size in the range of from 10 to 18 nm; (d) a total intruded volume in the range of from 2.6 to 4 $cm^3/g$; (e) an intruded volume in the range of from 0.9 to 2 $cm^3/g$ for pores having diameters in the range of from 20 to 100 nm; and (f) an $SR_{20}$ of less than 0.037 $\Omega \cdot m$.

Although both are silicas, it is important to distinguish amorphous precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579.

Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Amorphous precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Amorphous precipitated silica, then, may be described as precipitated aggregates of ultimate particles of colloidal amorphous silica which aggregates have not at any point existed as macroscopic gel during the preparation. The sizes of the aggregates and the degree of hydration may vary widely.

Amorphous precipitated silica powders differ from silica gels that have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

Variations in the parameters and/or conditions during production result in variations in the types of precipitated silicas produced. Although they are all broadly amorphous precipitated silicas, the types of amorphous precipitated silicas often differ significantly in physical properties and sometimes in chemical properties. These differences in properties are important and often result in one type being especially useful for a particular purpose but of marginal utility for another purpose, whereas another type is quite useful for that other purpose but only marginally useful for the first purpose.

The CTAB surface area of the amorphous precipitated silica of the present invention may vary, but in most instances the CTAB surface area is in the range of from 140 to 185 square meters per gram ($m^2/g$). From 160 to 185 $m^2/g$ is preferred. As used in the present specification and claims, the CTAB surface area of the amorphous precipitated silica is the CTAB surface area determined in accordance the following procedure: Using a top loader balance, 11.0 grams (g) of cetyltrimethylammonium bromide, also known as CTAB and as hexadecyltrimethylammonium bromide, [CAS 57-09-0] is weighed to the nearest one-tenth milligram and the weight expressed in grams, C, is recorded. The weighed CTAB is dissolved in distilled water and diluted with distilled water to 2 liters in a volumetric flask to form a standard CTAB solution which is stored in the dark for at least 12 days before use. Using top loader balance, 3.70 grams of Aerosol® OT sodium di(2-ethylhexyl) sulfosuccinate [CAS 577-11-7] (American Cyanamid Co., Wayne, N.J.) is weighed. The weighed Aerosol® OT sodium di(2-ethylhexyl) sulfosuccinate is dissolved in distilled water and diluted with distilled water to 2 liters in a volumetric flask to form a standard Aerosol® OT solution which is stored in the dark for at least 12 days before use. The useful storage lives of the standard CTAB solution and the standard Aerosol® OT solution are two months after preparation. Using a pipet, 10.0 milliliters (mL) of the CTAB standard solution is transferred to a 250 mL Erlenmeyer flask containing a stirring bar. Next, 30 mL chloroform, 50 mL distilled water, 15 drops of 0.02% bromophenol blue aqueous indicator solution, and one drop of 1N aqueous NaOH solution are added to the flask. With vigorous stirring but minimal splashing, the contents of the Erlenmeyer flask are titrated with the standard Aerosol® OT solution from a 50 mL buret. The titration is begun at a rapid drop rate (the stopcock is never wide open) down to about 25 to 30 mL and then more slowly, dropwise, to the end point which will occur at about 37.5 mL. The approach to the end point is characterized first by a milky blue color throughout. Then, as the end point is more closely approached, the bottom chloroform layer becomes a more intense blue and the top aqueous layer takes on a lilac or purple hue. Immediately before the end point, the whole mixture becomes visibly clearer (i.e., less "milky") and the bottom layer is seen as a very intense blue. Using a wash bottle, the inside of the flask is washed down with no more than 25 mL of distilled water. The stirrer speed is increased to resume vigorous mixing for efficient contacting of the two liquid phases. At least 10 seconds are allowed to elapse after each dropwise addition of titrant immediately prior to the endpoint. Stirring is stopped frequently to allow the phases to separate so that the analyst can become familiar with these color changes and then vigorous stirring is resumed. At the end point the bottom phase loses all color and displays a colorless or milky white appearance while the top phase is intensely purple. The procedure is performed at least two times and the average volume of standard Aerosol® OT solution used per titration, $V_1$, is recorded. A 200 mL wide mouth glass bottle is tared and approximately 0.500 gram of silica sample (in the as-received state, not dried) is placed in the bottle and weighed to the nearest 0.1 mg. This silica sample weight, S, is recorded. One hundred milliliters of the standard CTAB solution is pipetted into the bottle and a stirring bar is carefully added. Using a 50 mL pipet, filling and delivering twice, is preferred as the liquid level is easier to control than with a 100 mL pipet. A cap is screwed on the bottle and the contents are stirred gently for 15 minutes without pH adjustment. A pH electrode is placed into the solution in the bottle and gentle stirring is resumed. The pH is adjusted to between 9.0 and 9.5 using 1N aqueous NaOH added dropwise; approximately 5 drops of the 1N NaOH solution are required before the pH stabilizes between 9.0 and 9.5. When the pH has been stabilized between 9.0 and 9.5, the top of the bottle is covered with aluminum foil or equivalent to retard evaporation loss. The mixture is stirred gently for one hour at pH 9.0 to 9.5. The silica-liquid mixture is transferred to centrifuge tubes, balancing them by weighing on a top loader balance. The mixture is centrifuged for 30 minutes to produce a clear centrifugate. Clear centrifugate is carefully withdrawn using a dropping pipet and transferred to a small glass bottle. Using a pipet, 10.0 mL of the centrifugate is transferred into a 250 mL Erlenmeyer flask containing a stirring bar. Next, 30 mL chloroform, 50 mL distilled water, and 15 drops of 0.02% bromophenol blue aqueous indicator solution are added to the flask. The contents of the Erlenmeyer flask are titrated with the standard Aerosol® OT solution from a 50 mL buret using the same procedure and to the same endpoint used in titrating the standard CTAB solution. The volume of standard Aerosol® OT solution used, $V_2$, is recorded. A small glass bottle (less cap) is heated for 2 hours at 105° C. in an oven and cooled in a desiccator. The weight is recorded to the nearest 0.1 milligram (mg). Approximately one gram of silica sample is added to the bottle and the weight is recorded to the nearest 0.1 mg. The bottle and the sample are heated in an oven for 2 hours at 105° C. The bottle containing the sample is removed from the oven, immediately capped, and cooled in a desiccator. When cooled to ambient temperature, the cap is removed and the weight of the bottle containing the sample is recorded to the nearest 0.1 mg. The tare weight of the bottle is subtracted from the sample weighings and the weight in grams of the silica before heating, A, and the weight in grams of the silica after heating, B, are recorded. The CTAB surface area (dry basis), $A_{CTAB}$, expressed in $m^2/g$, is calculated according to the formula:

$$A_{CTAB} = \frac{(V_1 - V_2)(C)(A)(28.92)}{(V_1)(S)(B)}$$

The DBP oil absorption of the amorphous precipitated silica of the present invention may vary widely. In many instances the DBP oil absorption is from 210 to 310 cubic centimeters per 100 grams ($cm^3/100$ g). Often the DBP oil absorption from 230 to 310 $cm^3/100$ g. From 250 to 310 $cm^3/100$ g is preferred. As used in the present specification and claims, DBP oil absorption of the particles is determined according to ASTM D 2414-93 using dibutyl phthalate [CAS 84-74-2] as the absorbate and a Type E Absorptometer with the procedure modified as follows: (1) a sample of silica weighing 12.5±0.1 grams (g) which is not further dried is introduced to the Type E Absorptometer, (2) the moisture content of another sample of the silica weighing between 10 and 11 grams is determined using an Ohaus® moisture balance (Ohaus Corporation, Florham Park, N.J.) with settings at 160° C. and 10 minutes, and (3) the DBP oil absorption is calculated from the equation:

$$OA = 100V/S + 3.9(M - 1.7)$$

where:
  OA is the DBP oil absorption, $cm^3/100$ g,
  V is the volume of dibutyl phthalate used, $cm^3$,
  S is the weight of the silica sample, g, and
  M is the moisture content, percent $H_2O$ by weight.

The amorphous precipitated silica may be in the form of aggregates of ultimate particles, agglomerates of aggregates, or a combination of both. The mean ultimate particle size of the amorphous precipitated silica of the invention (irrespective of whether or not the ultimate particles are aggregated and/or agglomerated) may vary considerably, but usually it is in the range of from 10 to 18 nanometers (nm). Often the mean ultimate particle size is in the range of from 12 to 17 nm. From 13 to 16 nm is preferred. As used herein and in the claims the mean ultimate particle size is determined by ascertaining the diameters of at least 256 well-defined ultimate particles using transmission electron microscopy and then calculating the arithmetic mean of the diameters so ascertained.

The total intruded volume of the amorphous precipitated silica of the present invention may vary widely. In many cases, however, the total intruded volume is in the range of from 2.6 to 4 cubic centimeters per gram ($cm^3/g$). Frequently, the total intruded volume is in the range of from 2.9 to 4 $cm^3/g$. Preferably the total intruded volume is from 2.9 to 3.8 $cm^3/g$.

The intruded volume of the amorphous precipitated silica of the present invention for pores having diameters in the range of from 20 to 100 nanometers (nm) may also vary widely. In many cases the intruded volume for pores having diameters in the range of from 20 to 100 nm is in the range of from 0.9 to 2 cubic centimeters per gram ($cm^3/g$). Preferably the intruded volume for pores having diameters in the range of from 20 to 100 nm is from 0.9 to 1.5 $cm^3/g$.

Both intruded volumes are determined by mercury porosimetry using an Autoscan mercury porosimeter (Quantachrome Corp.) in accordance with the accompanying operating manual. In operating the porosimeter, a scan is made in the high pressure range (from 103 kilopascals absolute to 227 megapascals absolute). The total intruded volume is the total volume of mercury which is intruded into the amorphous precipitated silica during the high pressure scan described above divided by the mass of the amorphous precipitated silica constituting the sample under test. The other intruded volume is that for pores having diameters in the range of from 20 to 100 nm divided by the mass of the amorphous precipitated silica constituting the sample under test.

The electrical-imparting properties of the amorphous precipitated silica of the present invention are determined using a standard battery separator formulation and a standard protocol for making a battery separator, as follows:

A dry mixture is formed by admixing the components in the amounts shown in Table 1 in a Henschel® high intensity mixer.

TABLE 1

| Component | Amount, percent by volume |
| --- | --- |
| Silica | 69.8 |
| UHMWPE (1) | 8.4 |
| Lubricant (2) | 0.2 |
| Antioxidant (3) | 0.1 |
| Carbon Black/polyethylene (4) | 0.6 |

(1) UHMWPE = Ultrahigh Molecular Weight polyethylene, GUR 413, Hoechst Celanese Corp.
(2) Petrac® CZ81, Synpro Corp.
(3) Irganox® B215, Ciba-Geigy Corp.
(4) Polyblak® 1850, A. Schulman, Inc.

The standard battery separator formulation is formed by admixing 79.1 parts by volume of the above dry mixture with 21.5 parts by volume of Shellflex® 3681 processing oil (Shell Chemical Co.) in a Henschel® high intensity mixer. The final mixture is in the form of a free-flowing powder. The final mixture is fed to a C. W. Brabender conical counter-rotating twin screw extruder. The extruder length to diameter ratio is 17/1. The screw diameter at the feed port is 42 millimeters and at the discharge end of the extruder is 25 millimeters. The extruder barrel comprises three temperature zones. The extrusion mixture feed port is located just prior to the first temperature zone. Additional Shellflex® 3681 processing oil is added to the first temperature zone during extrusion to bring the total oil content in the extruded product to from 64 to 65 percent by weight. An atmospheric vent is located in the second temperature zone. Extrudate from the barrel discharges into a 10.15 centimeter wide sheet die having a 1.524 millimeter discharge opening. Screen packs are in 14/60/14 mesh. The extrusion temperature is 215° C. The throughput is 7.71 kilograms per hour. The extrudate is calendered at 3.66 meters per minute to a sheet 0.203 millimeter thick and 15.24 centimeters wide. the extruded sheet is allowed to cool.

The cooled sheet is then die cut to rectangular sheets 12.7 centimeters long (machine direction) and 11.4 centimeters wide (cross direction). The rectangular sheets are extracted to equilibrium in a mixture of 12 weight percent Shellflex® 3681 processing oil and 88 weight percent n-hexane and then air dried at room temperature.

Some of the dry rectangles are extracted with n-hexane, boiled in water for ten minutes, soaked in battery acid (1.280±0.005 grams sulfuric acid per milliliter) for 20 minutes, and then tested for specific resistance. The result is a Standard Ten Minute Boil Specific Resistance, abbreviated "$SR_{10}$" and is expressed in units of ohm·meters ($\Omega \cdot m$). Since this value is obtained under standard conditions, it is a characteristic of the amorphous precipitated silica used in the battery separator formulation.

Others of the dry rectangles are soaked in battery acid (1.280±0.005 grams sulfuric acid per milliliter) at 26.5±0.5° C. for 20 minutes and then tested for specific resistance. The result is a Standard Twenty Minute Soak Specific Resistance, abbreviated "$SR_{20}$" and is expressed in units of ohm·meters ($\Omega \cdot m$). Since this value is obtained under standard conditions, it is a characteristic of the amorphous precipitated silica used in the battery separator formulation.

The specific resistance of the rectangles are determined using a Palico Model 9000-9001 Test Bath in a constant temperature water bath (26.5±0.5° C.) and a Palico Model 100-2 System (Palico Instrument Laboratories, Circle Pines, Minn.) in accordance with the operating manual. Inasmuch as these values are obtained under standard conditions, they are characteristics of the amorphous precipitated silica used in the battery separator formulation.

The Standard Ten Minute Boil Specific Resistance may vary, but it is preferred that this value be low. In most instances the precipitated silica of the present invention is characterized by an $SR_{10}$ of less than 0.025 $\Omega \cdot m$. Frequently the $SR_{10}$ is less than 0.023 $\Omega \cdot m$. Preferably the $SR_{10}$ is less than 0.021 $\Omega \cdot m$.

Similarly, the Standard Twenty Minute Soak Specific Resistance may vary, but it is preferred that this value be low. Usually the amorphous precipitated silica of the present invention is characterized by an $SR_{20}$ of less than 0.037 $\Omega \cdot m$. Frequently the $SR_{20}$ is less than 0.036 $\Omega \cdot m$. Preferably the $SR_{20}$ is less than 0.035 $\Omega \cdot m$.

The amorphous precipitated silica of the present invention may be made by a process comprising: (a) establishing an additive aqueous sodium silicate solution containing from 50 to 120 grams $Na_2O$ per liter and having an $SiO_2:Na_2O$ molar ratio of from 3 to 3.4; (b) establishing an initial aqueous sodium silicate solution containing from 50 to 120 grams $Na_2O$ per liter and having an $SiO_2:Na_2O$ molar ratio of from 3 to 3.4; (c) adding ambient temperature water to a reactor having a primary agitator and a supplemental high speed agitator located near the site of acid addition; (d) when the water level in the reactor is high enough that agitation with the primary agitator is possible, adding initial aqueous sodium silicate solution and water to the reactor with agitation to establish a second aqueous sodium silicate solution containing from 1.5 to 7 grams $Na_2O$ per liter and having an $SiO_2:Na_2O$ molar ratio of from 3 to 3.4; (e) injecting live steam into the second aqueous sodium silicate solution to form a third sodium silicate solution at a temperature in the range of from 70° C. to 90° C.; (f) over a period of 90 minutes while maintaining the temperature in the range of from 70° C. to 90° C., adding acid and additive sodium silicate solution with primary agitation and with supplemental high speed agitation at the site of acid addition, to the third aqueous sodium silicate solution such that the $Na_2O$ concentration remains in the range of from 1.5 to 7 grams $Na_2O$ per liter and such that from 2 to 26 times as much sodium silicate is added as was present in the third sodium silicate solution; (g) optionally aging the reaction mixture for from 0 to 130 minutes with the supplemental high speed mixer off; (h) starting the high speed mixer and adding acid until the pH of the reaction mixture is in the range of from 3 to 4.5; (i) filtering and washing to a final sodium sulfate concentration of 2 percent by weight or less on a dry weight basis; and (j) drying the washed amorphous precipitated silica.

The acid used in the process may vary widely. In general, the acid added in step (f) should be strong enough to neutralize alkali metal silicate and cause precipitation of silica. The acid added in step (h) should be strong enough to reduce the pH to desired values within the specified range. The acid used in the various acid addition steps may be the same or different, but preferably it is the same. A weak acid such as carbonic acid produced by the introduction of carbon dioxide to the reaction mixture may be used for precipitation of silica, but a stronger acid must be used in step (h) when it is desired to reduce the pH to values below 7. It is preferred to use strong acid throughout the process. Examples of the strong acids include sulfuric acid, hydrochloric acid, nitric acid, phosphoric acid, and acetic acid. The strong mineral acids such as sulfuric acid, hydrochloric acid, nitric acid, and phosphoric acid are preferred; sulfuric acid is especially preferred.

The washing of step (i) may be accomplished by any of the procedures known to the art for washing solids. Examples of such procedures include passing water through a filter cake, and reslurring the precipitated silica in water followed by separating the solids from the liquid. One washing cycle or a succession of washing cycles may be employed as desired.

The drying of step (j) may be accomplished by one or more known techniques. For example, the precipitated silica may be dried in an air oven or in a vacuum oven. Preferably the precipitated silica is dispersed in water and spray dried in a column of hot air. The temperature at which drying is accomplished is not critical, but the usual practice is to employ temperatures of at least 400° C. Generally the temperature is less than 800° C. In most cases drying is continued until the precipitated silica has the characteristics of a powder. Ordinarily the dried precipitated silica is not absolutely anhydrous but contains adsorbed water (from 1 to 7 weight percent) in varying amounts, the latter depending partly upon the prevailing relative humidity. Adsorbed water is that water which is removed from a sample of the silica weighing between 10 and 11 grams using an Ohaus moisture balance with settings at 160° C. and 10 minutes.

An optional step which may be employed is size reduction. Size reduction techniques are themselves well known and may be exemplified by grinding, pulverizing, and fluid energy milling.

The degrees of agitation used in the various steps of the invention may vary considerably. The agitation employed during the addition of one or more reactants should be at least sufficient to provide a thorough dispersion of the reactants and reaction mixture so as to avoid more than trivial locally high concentrations of reactants and to ensure that silica deposition occurs substantially uniformly thereby avoiding gellation on the macro scale. The agitation employed during aging should be at least sufficient to avoid settling of solids to ensure that silica deposition occurs substantially uniformly throughout the mass of silica particles rather than preferentially on those particles at or near the top of a settled layer of particles. The degrees of agitation may, and preferably are, greater than these minimums. In general, vigorous agitation is preferred.

The invention is further described in conjunction with the following examples which are to be considered illustrative rather than limiting, and in which all parts are parts by weight and all percentages are percentages by weight unless otherwise specified.

EXAMPLE

Stock aqueous sodium silicate solution was prepared containing about 70 grams $Na_2O$ per liter and having an $SiO_2:Na_2O$ molar ratio of 3.2. A 100-liter reactor equipped with steam coils for heating, an inlet for sodium silicate solution, an inlet for acid, an outlet, a primary agitator, and a supplemental high-speed agitator located near the site of acid addition, was charged with 50.1 liters of deionized water which was heated to 56° C. using the steam coils. Over a period of 27.7 minutes and with agitation provided by the primary agitator, 4.871 liters of stock aqueous sodium silicate solution was added such that the concentration of $Na_2O$ in the solution in the reactor was about 0.20 normal. The solution in the reactor was heated to 88° C. using the steam coils. With both agitators running and over a period of 90 minutes, separate streams of 15.832 liters of stock aqueous sodium silicate solution and 0.885 liter of 96 weight percent aqueous sulfuric acid were added. Upon completion of the additions the supplemental high speed mixer was shut off and the reaction mixture was aged for 70 minutes at pH 9.7 while the temperature was maintained at 88° C. At the conclusion of the aging period the supplemental high speed mixer was started and 96 weight percent aqueous sulfuric acid was added at a rate of 10.1 milliliters per minute until the pH of the reaction mixture was 3.8. The resulting slurry was transferred to several large 32-centimeter diameter Buchner funnels and washed with deionized water until the $Na_2SO_4$ content on a dry basis was 0.4 percent by weight. The filter cakes were removed from the funnels and, together with a small amount of added water, were liquefied by agitation and spray dried. The product was particulate amorphous precipitated silica having the following physical characteristics:

| | |
|---|---|
| CTAB Surface Area | 176 $m^2/g$ |
| DBP Oil Absorption | 303 $cm^3/100$ g |
| Mean Ultimate Particle Size | 13.7 nm |
| Total Intruded Volume | 3.5 $cm^3/g$ |
| Intruded Volume for Pores Having Diameters in the Range of from 20 to 100 nm | 0.98 $cm^3/g$ |
| Median Particle Size | 18.9 $\mu m$ |
| $SR_{10}$ | 0.0206 $\Omega \cdot m$ |
| $SR_{20}$ | 0.0331 $\Omega \cdot m$ |

Although the present invention has been described with reference to specific details of certain embodiments thereof, it is not intended that such details should be regarded as limitations upon the scope of the invention except insofar as they are included in the accompanying claims.

We claim:

1. Amorphous precipitated silica characterized by:
   (a) a CTAB surface area in the range of from 140 to 185 $m^2/g$;
   (b) a DBP oil absorption in the range of from 210 to 310 $cm^3/100$ g;
   (c) a mean ultimate particle size in the range of from 10 to 18 nm;
   (d) a total intruded volume in the range of from 2.6 to 4 $cm^3/g$;
   (e) an intruded volume in the range of from 0.9 to 2 $cm^3/g$ for pores having diameters in the range of from 20 to 100 nm; and
   (f) an $SR_{20}$ of less than 0.037 $\Omega \cdot m$.

2. The amorphous precipitated silica of claim 1 further characterized by an $SR_{10}$ of less than 0.025 $\Omega \cdot m$.

3. The amorphous precipitated silica of claim 1 characterized by (a) a DBP oil absorption in the range of from 230 to 310 cm$^3$/100 g;
(b) a mean ultimate particle size in the range of from 12 to 17 nm;
(c) a total intruded volume in the range of from 2.9 to 4 cm$^3$/g;
(d) an SR$_{10}$ of less than 0.023 Ω·m; and
(e) an SR$_{20}$ of less than 0.036 Ω·m.

4. The amorphous precipitated silica of claim 1 characterized by
(a) a CTAB surface area in the range of from 160 to 185 m$^2$/g;
(b) a DBP oil absorption in the range of from 250 to 310 cm$^3$/100 g;
(c) a mean ultimate particle size in the range of from 13 to 16 nm;
(d) a total intruded volume in the range of from 2.9 to 3.8 cm$^3$/g;
(e) an intruded volume in the range of from 0.9 to 1.5 cm$^3$/g for pores having diameters in the range of from 20 to 100 nm;
(f) an SR$_{10}$ of less than 0.021 Ω·m; and
(g) an SR$_{20}$ of less than 0.035 Ω·m.

* * * * *